3,140,272
PROCESS FOR PRODUCING POLYMERIC
FORMALDEHYDE
Naoya Yoda, Kyoto-shi, Kyoto-fu, and Akira Higuchi, Ohtsu-shi, Shiga-ken, Japan, assignors to Toyo Rayon Co., Ltd., Tokyo, Japan, a corporation of Japan
No Drawing. Filed Sept. 7, 1961, Ser. No. 136,436
Claims priority, application Japan Jan. 5, 1961
2 Claims. (Cl. 260—67)

This invention relates to a process for producing a high molecular polymeric formaldehyde by means of a polymerization of substantially anhydrous purified formaldehyde introduced into a novel polymerization solvent.

The novel polymerization solvent used in the present invention is an amide compound represented by the general formula

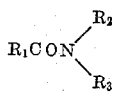

wherein $R_1$ is hydrogen, methyl or phenyl, and $R_2$ and $R_3$ are either hydrogen or methyl.

It is well known in the prior art that formaldehyde may be polymerized to give polymers having various properties. For instance the well known methods include a process for producing a high molecular polyoxymethylene by polymerizing formaldehyde gas introduced in inert solvents at the presence of various polymerization catalysts, said formaldehyde being produced from $\alpha$-polyoxymethylene by heat decomposition. As the polymerization catalysts, amines, hydrazines and morpholines (Japan patent application publication No. 9794/1957): metal carbonyls (U.S.P. 2,734,889 and B.P. 766,524); and trialkyl or triaryl derivatives of metals such as Sn, As and Sb, have been proposed.

The present inventors have studied many polymerization conditions usable for said polymerization, and have found that when substantially anhydrous purified formaldehyde gas is introduced into the amide solvent, a high molecular polymeric formaldehyde having a high heat stability can be obtained even in the absence of any polymerization catalysts.

The amide compound used in the present invention as a polymerization solvent, has the advantage of allowing a more wide temperature range ($-80$–$+125°$ C.) for the polymerization than those of amines catalysts, metal carbonyl compounds, arsenic-, antimony- or tin-compounds in inert solvents, so the polymerization in the amide solvents can be carried out at the room temperature. Furthermore, the necessary amounts of the amide solvents can be reduced to the three times of that of formaldehyde monomer to be polymerized. Moreover, the amide compounds are available with a low cost. Thus the present invention is regarded to be advantageous.

The invention will be described in detail hereinafter.

Formalin, paraformaldehyde or hemiformal of an aliphatic alcohol is subjected to thermal decomposition to give formaldehyde gas, which is passed through cold traps (from $0°$ to $-80°$ C.) whereby the gas is purified thoroughly. The resulting purified formaldehyde gas is polymerized continuously at a temperature from $-80°$ to $+125°$ C. in the solvent of the above amide compound without any catalysts, and without any other solvents inert for formaldehyde. Thus a high molecular polyoxymethylene is produced.

The amide compound used in the present invention is, for example, formamide, monomethylformamide, dimethylformamide, acetamide, or benzamide.

The present invention can be effected with the above procedure, i.e. the procedure of introducing and polymerizing anhydrous purified formaldehyde continuously in the polymerization solvent.

The following examples are given for illustrating the present invention.

Example 1

100 parts of hemiformal of n-octanol is subjected to thermal decomposition at a temperature of $120$–$160°$ C., and the resulting gaseous formaldehyde monomer is passed through three purification traps maintaining at temperatures of $-10°$ C., $-15°$ C. and $-20°$ C. respectively to purify it thoroughly. The purified monomer under a nitrogen stream is introduced continuously into 400 parts of dimethylformamide with stirring at the temperature of $+60°$ C. The resulting polymer is filtered off, washed with acetone several times and dried under a reduced pressure. 27.96 parts (93.2% yield) of white powdery polymeric formaldehyde is obtained. It has an inherent viscosity of 1.823 determined in a 0.5% solution in p-chlorophenol at $60°$ C., and has a good thermal stability.

Example 2

The purified monomer is bubbled into dimethylformamide as the procedure of Example 1. The monomer is polymerized (its polymerization temperature is $-20°$ C.) with 71.4% yield. The resulting polymer has an inherent viscosity of 1.3.

Example 3

30 parts of $\alpha$-polyoxymethylene is subjected to thermal decomposition at a temperature of $120$–$140°$ C. using a fluid paraffin as a heating medium, and the resulting gaseous formaldehyde under a nitrogen stream in introduced continuously into 500 parts of dimethylformamide with stirring at the temperature of $+60°$ C. The resulting polymer is filtered off, washed with an acetone several times and dried under a reduced pressure. 28.56 parts (95.2% yield) of white powdery polymeric formaldehyde is obtained. It has an inherent viscosity of 1.684 determined in p-chlorophenol at $60°$ C., and has a good thermal stability.

We claim:

1. A process for producing polymeric formaldehyde which comprises introducing substantially anhydrous purified formaldehyde into a body of polymerizing liquid initially consisting entirely of an amide compound represented by the general formula

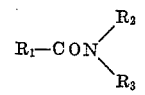

wherein $R_1$ is selected from the group consisting of hydrogen, methyl and phenyl and $R_2$ and $R_3$ are each selected from the group consisting of hydrogen and methyl, said introduction being effected at a temperature between $-80°$ C. and $+125°$ C. in the absence of any catalysts, the amount of said amide being not less than three times said amount of formaldehyde being introduced into said amide.

2. A process according to claim 1, wherein dimethyl formamide is used as the amide compound.

References Cited in the file of this patent
UNITED STATES PATENTS
2,296,249   Austin et al. _____ Sept. 22, 1942